(12) United States Patent
Kim et al.

(10) Patent No.: US 9,264,452 B2
(45) Date of Patent: Feb. 16, 2016

(54) APPARATUS AND METHOD FOR DIRECTING A COMMUNICATION SESSION TO A COMMUNICATION DEVICE OF A GROUP OF DEVICES HAVING A COMMON REGISTRATION IDENTITY

(75) Inventors: Youngae Kim, Mississauga (CA); Andrew Allen, Mundeleln, IL (US); Adrian Buckley, Tracy, CA (US); Jan John-Luc Bakker, Keller, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/617,511

(22) Filed: Sep. 14, 2012

(65) Prior Publication Data

US 2013/0013796 A1    Jan. 10, 2013

Related U.S. Application Data (63) Continuation of application No. 11/952,921, filed on Dec. 7, 2007, now abandoned.

(51) Int. Cl.
*G06F 15/177* (2006.01)
*G06F 15/16* (2006.01)
*H04L 29/06* (2006.01)
(Continued)

(52) U.S. Cl.
CPC ........ *H04L 65/1006* (2013.01); *H04L 65/1016* (2013.01); *H04L 65/1063* (2013.01); *H04L 65/1073* (2013.01); *H04L 65/1089* (2013.01); *H04N 7/173* (2013.01); *H04L 12/2803* (2013.01); *H04L 12/2812* (2013.01); *H04L 67/306* (2013.01); *H04L 2012/2849* (2013.01)

(58) Field of Classification Search
CPC ............ H04L 65/1069; H04L 65/1006; H04L 41/0803; H04L 49/20
USPC ........................................................ 709/227
See application file for complete search history.

(56) References Cited

U.S. PATENT DOCUMENTS 6,188,758 B1  2/2001  Christensen et al.
6,625,258 B1  9/2003  Ram et al.
(Continued)

FOREIGN PATENT DOCUMENTS

EP    17113234    2/2006
EP     2456170    5/2012
(Continued)

OTHER PUBLICATIONS

Rosenberg et al., RFC 3216, "SIP: Session Initiation Protocol", Jun. 2002, Network Working Group, Internet, p. 1-187.*
(Continued)

*Primary Examiner* — Taylor Elfervig
(74) *Attorney, Agent, or Firm* — Fish & Richardson P.C.

(57) ABSTRACT

An apparatus, and an associated method, for directing communications of a communication session to a selected communication device, or devices, of a group of commonly-registered devices. A device-direction policy is created and stored at a network entity. The policy identifies preferred devices to which communications of a communication session are to be provided. A SIP Invite, or other communication-session initiation message, is provided to the network entity. The network entity detects the message, accesses the policy, and forwards on the message in accordance with the policy.

11 Claims, 6 Drawing Sheets

(51) Int. Cl.
*H04N 7/173* (2011.01)
*H04L 12/28* (2006.01)
*H04L 29/08* (2006.01)

(56) References Cited

U.S. PATENT DOCUMENTS

| | | | |
|---|---|---|---|
| 6,985,961 | B1* | 1/2006 | Ramsayer et al. ............ 709/238 |
| 7,130,282 | B2 | 10/2006 | Black |
| 2001/0043694 | A1 | 11/2001 | Chartrand |
| 2002/0187777 | A1* | 12/2002 | Osterhout et al. ............ 455/417 |
| 2003/0023730 | A1* | 1/2003 | Wengrovitz et al. .......... 709/227 |
| 2003/0039238 | A1 | 2/2003 | Ollis et al. |
| 2003/0110234 | A1 | 6/2003 | Egli et al. |
| 2004/0083291 | A1 | 4/2004 | Pessi et al. |
| 2004/0249951 | A1* | 12/2004 | Grabelsky et al. ............ 709/227 |
| 2005/0018659 | A1* | 1/2005 | Gallant et al. ................ 370/352 |
| 2005/0060411 | A1 | 3/2005 | Coulombe et al. |
| 2005/0069099 | A1 | 3/2005 | Kozdon et al. |
| 2005/0096029 | A1 | 5/2005 | Pelaez et al. |
| 2006/0105766 | A1 | 5/2006 | Azada et al. |
| 2006/0189340 | A1 | 8/2006 | Sung et al. |
| 2006/0235981 | A1 | 10/2006 | Westman et al. |
| 2006/0235994 | A1 | 10/2006 | Wu |
| 2007/0250569 | A1 | 10/2007 | Mutikainen et al. |
| 2007/0258477 | A1* | 11/2007 | Huh .............................. 370/416 |
| 2007/0281676 | A1 | 12/2007 | Borras et al. |
| 2008/0083010 | A1 | 4/2008 | Koehler et al. |
| 2009/0004907 | A1 | 1/2009 | Goldman et al. |
| 2009/0017856 | A1* | 1/2009 | Albertsson et al. ........... 455/518 |
| 2009/0049087 | A1 | 2/2009 | Cackowski et al. |
| 2009/0150562 | A1 | 6/2009 | Kim et al. |
| 2010/0217698 | A1 | 8/2010 | Kang et al. |
| 2013/0013735 | A1 | 1/2013 | Kim et al. |
| 2013/0318248 | A1 | 11/2013 | Kim et al. |

FOREIGN PATENT DOCUMENTS

| | | | |
|---|---|---|---|
| EP | 2456171 | 5/2012 | |
| FI | WO 2005/109940 A1 * | 11/2005 | ............... H04Q 7/38 |
| WO | 2008074117 A1 | 6/2008 | |

OTHER PUBLICATIONS

Shacham et al., "Session Initiation Protocol (SIP) Session Mobility" (draft-shacham-sipping-session-mobility-05), Nov. 2007, Sipping, Internet Draft, p. 1-28.*
Vineel, G.C., "Analysis of system performance for differentiated handling of SIP requests," in IP Multimedia Subsystem Architecture and Applications, 2007 International Conference on , vol., No., pp. 1-4, Dec. 6-8, 2007.*
Salsano, S.; Veltri, L.; Papalilo, D., "SIP security issues: the SIP authentication procedure and its processing load," in Network, IEEE, vol. 16, No. 6, pp. 38-44, Nov./Dec. 2002.*
Tae-Gyu Kang; Hyun-Joo Bae; Do-young Kim; Dae-Ung Kim, "SIP/SDP signaling of media gateway with transcoding function in converged network," in Advanced Communication Technology, 2004. The 6th International Conference on , vol. 2, No., pp. 842-845, Feb. 9-11, 2004.*
CIPO, Office Action, Application No. 2,710,936, Sep. 11, 2012, 2 pgs.
PCT, International Search Report and Written Opinion, Application No. PCT/US2008/085580, Aug. 20, 2009, 14 pgs.
USPTO, Office Action, U.S. Appl. No. 11/952,921, Oct. 9, 2009, 18 pgs.
USPTO, Office Action, U.S. Appl. No. 11/952,921, Apr. 1, 2010, 28 pgs.
USPTO, Office Action, U.S. Appl. No. 11/952,921, Mar. 28, 2012, 19 pgs.
USPTO, Office Action, U.S. Appl. No. 11/952,921, Sep. 4, 2012, 25 pgs.
USPTO, Interview Summary, U.S. Appl. No. 11/952,921, Nov. 7, 2012, 5 pgs.
EPO, Extended European Search Report, Application No. 08150155.3, Apr. 28, 2008, 7 pgs.
EPO, Communication Pursuant to Article 94(3) EPC, Application No. 08150155.3, Feb. 3, 2010, 3 pgs.
EPO, Communication Pursuant to Article 94(3) EPC, Application No. 08150155.3, Dec. 30, 2011, 7 pgs.
EPO, Extended European Search Report, Application No. 12154938.0, Apr. 24, 2012, 8 pgs.
EPO Extended Search Report, Application No. 12154939.8, Apr. 24, 2012, 8 pgs.
Converged IP Messaging Requirements Candidate Version 1.0 ? 06, Nov. 6, 2007, pp. 1-71, XP002475847.
Schulzrinne, Session Initiation Protocol (SIP) Session Mobility; Draft No. 3, Nov. 13, 2006, 7 pgs, XP015048519.
USPTO, Notice of Publication, U.S. Appl. No. 13/617,288, Jan. 10, 2013, 1 pg.
USPTO, Office Action, U.S. Appl. No. 13/617,288, Mar. 1, 2013, 14 pgs.
USPTO, Office Action, U.S. Appl. No. 13/617,288, Feb. 27, 2014, 17 pgs.
USPTO, Interview Summary, U.S. Appl. No. 13/617,288, Apr. 11, 2014, 3 pgs.
USPTO, Office Action, U.S. Appl. No. 11/952,921, Aug. 6, 2014, 38 pgs.
USPTO, Office Action, U.S. Appl. No. 13/617,288, Jul. 22, 2014, 19 pgs.
Shacham et al., "The virtual device: expanding wireless communication services through service discovery and session mobility," Wireless and Mobile Computing, Networking and Communications, 2005. (WiMob'2005), IEEE International Conference on , vol. 4, No., pp. 73,81 vol. 4, Aug. 22-24, 2005.
Rosenberg, "Request Authorization through Dialog Identification in the Session Initiation Protocol (SIP)", Jun. 2006, pp. 1-17, RFC 4538, Network Working Group.
Sparks, "The Session Initiation Protocol (SIP) Refer Method", Apr. 2003, pp. 1-22, RFC 3515, Network Working Group.
USPTO, Office Action, U.S. Appl. No. 13/955,095, Feb. 18, 2015, 12 pages.
PCT, International Preliminary Report on Patentability, Application No. PCT/US2008/085580, Jun. 17, 2010, 7 pages.
USPTO, Office Action, U.S. Appl. No. 11/952,921, Jan. 26, 2015, 27 pgs.
EPO, Communication Pursuant to Article 94(3) EPC, Application No. 08150155.3, Nov. 27, 2014, 7 pgs.
USPTO, Final Office Action, U.S. Appl. No. 13/617,288, Aug. 2, 2013, 24 pgs.
CIPO, Notice of Allowance, Application No. 2,710,936, Oct. 21, 2013, 1 pg.
USPTO, Interview Summary, U.S. Appl. No. 13/617,288, Oct. 25, 2013, 4 pgs.

* cited by examiner

| DEVICE CAPABILITIES (104) | USER PREFERENCES (106) |
|---|---|
| DEVICE A CAPABILITIES | SIP URIa<br>SIP URIb |
| DEVICE A CAPABILITIES<br>DEVICE C CAPABILITIES | GRUUa<br>TEL URIa |
| DEVICE Z CAPABILITIES | INSTANCE ID |

| MEDIA TOKEN e.g. COMMUNICATION SERVICE ID | USER PREFERENCES (116) |
|---|---|
| SERVICE IDa | MEDIA CHARACTERISTICS A<br>MEDIA CHARACTERISTICS B |
| SERVICE IDb | MEDIA CHARACTERISTICS C |

| MEDIA TYPE | USER PREFERENCES 116 |
|---|---|
| TOKEN A OR MEDIA CHARACTERISTICS A | SIP URIa<br>SIP URIb |
| TOKEN A, B | GRUUa<br>TEL URIa |
| TOKEN Y | INSTANCE ID |

| RAT TYPE 126 | MEDIA TOKEN ALLOWED OVER RAT |
|---|---|
| RAT1 | TOKEN A<br>TOKEN B |
| RAT2 | TOKEN Z<br>TOKEN Y |

APPARATUS AND METHOD FOR DIRECTING A COMMUNICATION SESSION TO A COMMUNICATION DEVICE OF A GROUP OF DEVICES HAVING A COMMON REGISTRATION IDENTITY

CROSS REFERENCE TO RELATED APPLICATION(S) AND CLAIM OF PRIORITY

This nonprovisional application is a continuation application claiming the benefit of the following prior United States patent application entitled: "APPARATUS AND METHOD FOR DIRECTING A COMMUNICATION SESSION TO A COMMUNICATION DEVICE OF A GROUP OF DEVICES HAVING A COMMON REGISTRATION IDENTITY", filed Dec. 7, 2007, application Ser. No. 11/952,921, which is hereby incorporated by reference. This application discloses subject matter related to the subject matter of the following U.S. patent application(s): (i) "APPARATUS AND METHOD FOR DIRECTING A COMMUNICATION SESSION TO A COMMUNICATION DEVICE OF A GROUP OF DEVICES HAVING A COMMON REGISTRATION IDENTITY", application Ser. No. 13/617,288, filed even date herewith, in the name(s) of Youngae Kim, Andrew Allen, Adrian Buckley and John-Luc Bakker; which is(are) hereby incorporated by reference.

FIELD OF THE DISCLOSURE

The present disclosure relates generally to a manner by which to direct a communication session or a communication message to a communication device of a group of devices having a common registration identity. More particularly, the present disclosure relates to an apparatus, and an associated method, for setting preferences for the routing of communication-session invitations or communication messages to a selected device, or devices, of the group.

The preferences include preferences based upon the types of media that are to be communicated pursuant to the communication session or communication message. A communication session invitation or communication message is forwarded to a device in conformity with the preferences.

BACKGROUND

For many, ready access to communication systems to permit communication therethrough is a necessity of everyday life. Advancements in communication technologies have permitted the development and deployment of a variety of communication systems that provide for the performance of various communication services. With increased capabilities of digital, and other, technologies, communication services that can be carried out include communication services that are increasingly data-intensive. Multimedia communication services, for instance, communication services that are formed of multiple media types, e.g., audio, text, and video, are amongst the communication services that have been developed and deployed as a result of advancements in digital communication technologies.

Multimedia communication services are, for instance, implementable by way of radio communication networks in which communication stations, i.e., devices, are capable of participating in a multimedia communication service. A cellular communication system is an exemplary type of radio communication system whose infrastructures have been widely deployed and whose services are widely utilized in many parts of the world. The multi-media capabilities are generally available only in new-generation devices. That is to say, older-generation, cellular communication stations generally are not multi-media capable. When a multi-media communication service is to be performed, the communication station that is to be a party to the communication service must be capable of participating pursuant to sending and receiving of the multi-media data of the communication service.

Conventionally, communication stations are provided with a single identity. Analogous to a conventional, telephonic system, communication stations are conventionally identified by a single identity, such as a telephone number that identifies a single telephone or cellular communication station. Technological advancements, however, permit concepts other than a single-mapping concept in which a single identity, e.g., a telephone number, maps uniquely only to a single line or device. For instance, the SIP (Session Initiation Protocol)-based signaling, as well as other Internet-based communication technology signaling, supports the concept of multiple devices that are registered with the same identity, such as a user identity, or URI. The SIP also supports the capability of multi-media communications including text, other types of messaging, along with audio and video within a single communication session or single Communication Message. A communication session is an association established between two or more devices or users for the purposes of communication (including real time and non real time) using any media type (including audio, video, text, data) or combinations of media types. A Communication Message is an atomic communication exchange between two or more devices or users that contains one or more media types (including audio, video, text, data).

With SIP, as well as the other Internet-based technologies, a user is able to have different identities. For instance, different identities are given to family, friends, co-workers, etc. And, communication filtering and diverting services are provided, based upon which identity to which a particular communication is addressed. A user, e.g., configures a call forwarding service to permit an address provided to family members to reach the user directly, while other communications are handled in other manners. For instance, communications from friends are forwarded to the user's personal voicemail while, e.g., communications of co-workers are forwarded to the office phone of the user and the user's office voicemail.

Additionally, the user is not required to have different identities for the user's home phone, personal mobile phone, work phone, corporate mobile phone, vacation home phone, laptop computer, VOIP (Voice Over Internet Protocol) client, fax machine, etc. Instead, a user is, if desired, reachable by way of a call placed to a single identity through routing of the call to the user's desired device such as the user's home phone, personal mobile phone, work phone, laptop computer, VOIP (Voice Over Internet Protocol) client, fax machine, etc. By providing the capability of using a single identity to identify multiple devices, multiple calling numbers, or other addressing indicia, need not be known by a calling party. Business cards with multiple calling numbers and address books with multiple numbers associated with a single person need not be used or maintained.

An additional advantage of the use of a single identity to identify multiple devices is that a user is able to direct communication sessions or Communication Messages in which different types of media are communicated to different devices, depending, e.g., upon which device is able to make use of the communicated media. For instance, a user is able to elect to accept a video call on a laptop computer rather than on a mobile phone.

Various issues and challenges, however, remain with respect to communications with devices that are registered with a common identity. Procedures relating to the direction of an SIP invitation, or analogous session initiation, remain to be resolved or improved. And, e.g., procedures in operation relating to modification of an ongoing communication session also remain to be resolved or improved.

It is in light of this background information relating to communications in a communication system that the significant improvements of the present disclosure have evolved.

DETAILED DESCRIPTION

The present description, accordingly, advantageously provides disclosure of an apparatus, and an associated method, by which to direct a communication session or Communication Message to a communication device of a group of devices having a common registration identity.

Through operation of an embodiment described in the present disclosure, a manner is provided for setting preferences for the routing of a communication session or Communication message to a selected device, or set of devices, of the group.

In one aspect of the present disclosure, the preferences information has a mapping of the types of media offered in the incoming communication session or Communication Message to a preferred device or set of devices. A communication session invitation, preliminary to a communication session, includes identification of characteristics of the associated communication session. A communication message includes identification of characteristics of the media contained in the communication message. The invitation or communication message is analyzed, and the invitation or communication message is forwarded to a device identified in the preferences.

In another aspect of the present description, the preferences form a device direction policy that is stored at a network entity, such as an application server through which an SIP invitation, or communication message, or other analogous session initiation message, is routed. Alternatively, the device direction policy is stored at a network entity, such as user preference profile server or XDMS from which another application server through which a SIP Invitation or other analogous session initiation message, is routed downloads the device direction policy. The SIP Invite message or communication message such as SIP Message is originated by an initiating party, and the SIP Invite or SIP message identifies an invited party together with identification of the initiating party together with the characteristics of the requested communication session or communication message, such as identification of the media types of which the communication system shall include. The Invite, or communication message, or analogous message is routed to the application server. The contents of the message are identified, and the device direction policy associated with the identity of the invited party is accessed. The policy identifies individual devices associated with the registered identity of the invited party that form preferred devices for the particular media type of a communication session. And, the SIP Invite, SIP Message or other, message is forwarded on to the identified device.

The device direction policy is selected by the registrant of the common registration identity or is selected by a system operator. When selected by the system operator, the application server is provisioned with the device direction policy through entry thereof by personnel of the system operator. When user-selected, a user creates the preferences, and sends the preferences to the application server. The message, for instance, is originated at a wireless device and forms, e.g., a USSD message, SIP Publish message, SIP Message message, or XCAP/HTTP request message. The USSD message, or other message, includes the preferences, i.e., entries, forming the device direction policy. In one implementation, the message includes an XML-formatted listing. Once delivered to the network, and routed to the application server, preference profile server or XDMS, the preferences are stored, subsequently to be accessed when an invitation is made to initiate a communication session or an incoming communication message is received.

In another aspect of the present disclosure, a mechanism is provided by which to enable on a per-session or per message basis, redirection due to a modification of the characteristics of the communication session, such as addition of an additional media type to the communication session. An inviting user requests modification of the media types of the communication session, and the message is routed to the application server, or other network entity. The media of the additional media type is then forwarded according to the preferences stored at the network entity.

Thereby, communications are carried out in accordance with the device direction policy that is set by the user, system operator, or other appropriate party. Modifications to an ongoing communication session are also handled according to the device direction policy.

In these, and other aspects, therefore, an apparatus, and an associated method, is provided for a communication device of a first device group. The first device group is comprised of at least one communication device. A device direction policy setter is configured to set, at the communication device, a device direction policy associated with the first device group that identifies device-direction handling of communication sessions or communication messages of selected media types. A memory element is configured to store the device direction policy.

In these, and other further aspects of the present disclosure, an apparatus, and an associated method, is provided for a communication network element that operates pursuant to a communication session or a communication message that includes at least one media type. A detector is configured to detect a request for initiation of the communication session or reception of a communication message. A memory element is configured to store a device direction policy that identifies device-direction handling of communication sessions and communication messages of selected media types. A request forwarder is configured to forward the request for initiation in conformity with the device direction policy. A request terminator is configured to send the request to terminate the ongoing communication session.

Figure 1:
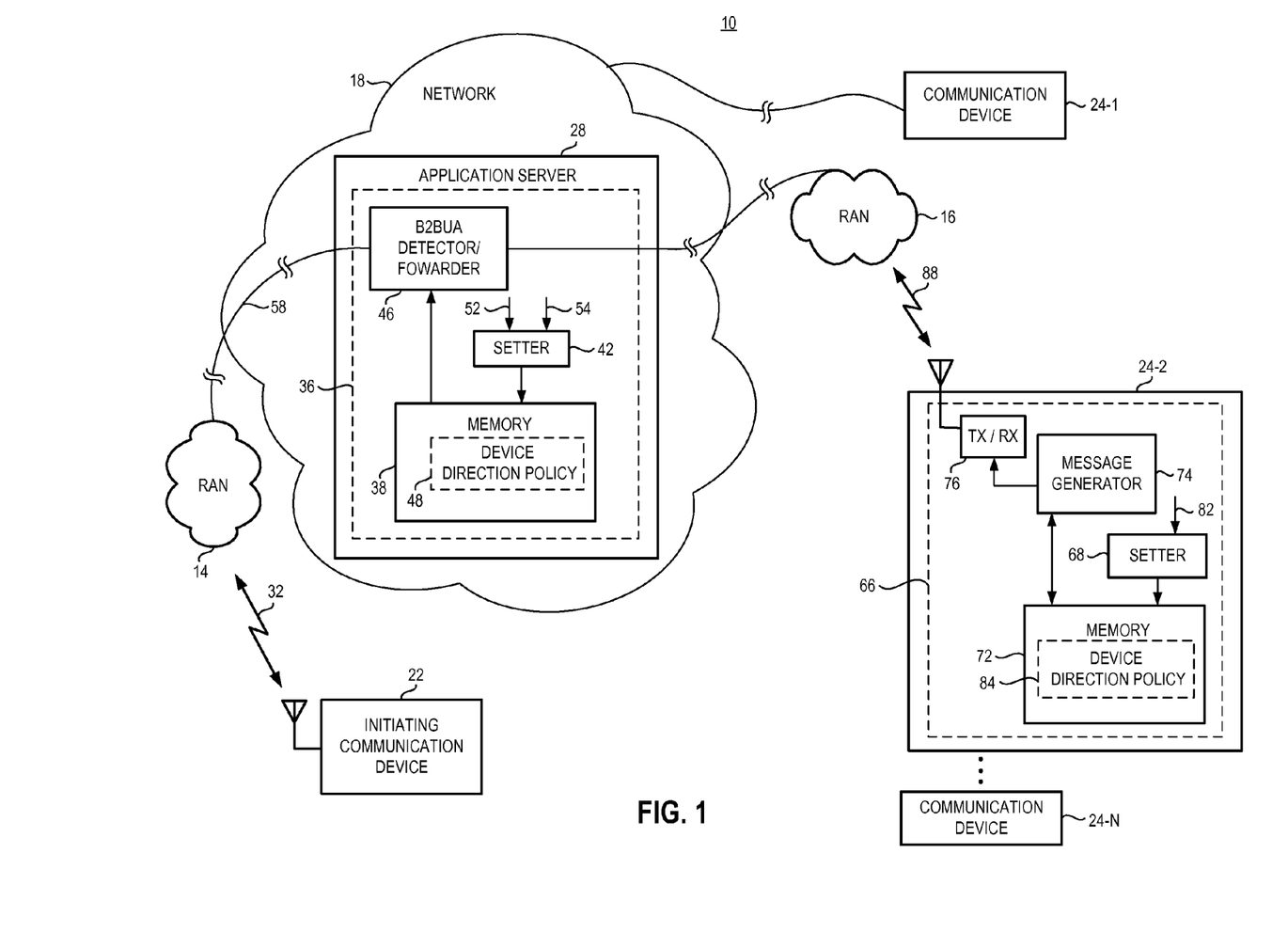
FIG. 1 illustrates a functional block diagram of a communication system in which an embodiment of the present disclosure is operable.

Referring first, therefore, to FIG. 1, a communication system, shown generally at 10, provides for communications between communication devices pursuant to a communication session, such as a communication session that includes multiple media types, viz., any combination of audio, text, and video media. In the exemplary implementation, the communication system provides for packet-based communications and, specifically, the communication systems provides for SIP (Session Initiation Protocol)-based services. In other implementations, other types of communication schemes and protocols are utilized. More generally, the communication system 10 is representative of any of various communication systems capable of communicating data between a set of communication stations, i.e., devices, in which a network entity is used to forward an initiation, re-initiation, or other message, such as an SIP Invite message or SIP Message method that are forwarded to a desired invited device of a group of devices identified by a common registration identity.

The communication system includes a network part, here including radio access networks (RANs) 14 and 16. The networks 14 and 16 are connected by way of a network 18, such as the Internet. Here, communications stations 22 and 24-1 through 24-N are positionable in communication connectivity to carry out a communication service. In the exemplary implementation shown in FIG. 1, the device 22 and the device 24-2 comprise wireless devices, such as wireless devices operable in a cellular mobile communication system. The device 22 forms an inviting party station, or device, and one or more of the devices 24 forms an invited device. The devices 24 are all identified by a common registration identification. But, each of the individual devices is identified by a separate address, e.g., a GRUU or individual telephone number or individual SIP URI or SIPS URI or other URI.

The network 18 is shown to include an application server 28 that is accessed pursuant to a communication session initiation or a communication message reception. The application-level server acts as a back-to-back user agent (B2BUA). The server thereby is capable of operation to act as the termination point for the SIP dialog and to direct, or redirect, messages to the preferred device of the invited user. Specifically with respect to an SIP-based session, a communication session is initiated with a SIP Invitation generated by the inviting device that is sent here by way of a radio air interface 32, through the radio access network 14, and through the network 18 for delivery to the application server 28. The application server 28 directs, or redirects, the Invite message on to one or more of devices 24.

The network includes apparatus 36 of an embodiment of the present disclosure. In the exemplary implementation, the apparatus is embodied at another network entity, or distributed amongst multiple entities of the network. The apparatus is here shown to include a memory element 38, a device direction policy setter 42, and a B2BUA (back-to-back user agent) entity 46 that operates as a detector, filter, forwarder, and terminator. The memory element includes storage locations capable of storing data forming a device direction policy 48.

The lines 52 and 54 are representative of policy information provided to the policy setter 42. The line 52 is representative of input information provided by a system operator, and the line 54 is representative input information provided by a device 24, here for purposes of example, by the device 24-2. In whatsoever manner that the device direction policy information is obtained, the setter operates to cause storage, at the memory 38, of information, such as in the form of the listing, the device direction policy. In one implementation, the setter comprises memory access lines that set the contents of a memory device, such as the memory element 38. The device direction policy is, for instance, indexed together with a common registration identity that is associated with the devices 24-1 through 24-N based on media types. Other commonly-referenced devices, analogous to the devices 24, have analogous policies that are also stored at the memory element. The SIP Invite, or a communication message or other session initiation message, is delivered to the application server, here represented by way of the line 58. The detector functionality of the entity 46 detects the Invite, or a communication message or other messages. And, the device direction policy of the registration identity identified in the Invite or a communication message or other messages is accessed. The device direction policy identifies to which device to forward the message based on media types. And, the forwarding functionality of the entity 46 operates to cause forwarding of the message to the device, or devices, identified in the device direction policy. Further communication operations may commence thereafter.

The device 24-2 includes further apparatus 66 of an embodiment of the present disclosure. Formation of the apparatus at the device 24-2, which is a wireless device, is exemplary. The apparatus, or analogous functionality, is also, or alternately, positioned at other devices 24 which are any kind of SIP enabled devices. The elements forming the apparatus are functionally represented, implementable in any desired manner, including, for instance, by algorithms executable by processing circuitry. The apparatus includes a device direction policy setter 68, a memory element 72, a message generator 74, and transceiver (TX/RX) circuitry 76. The memory element includes storage locations for data forming a device direction policy based on media types for the devices 24 that share the common registration identity. The setter receives information, here indicated by way of the line 82, that is, e.g., provided by user input by way of a user interface (not shown). In one implementation, the setter comprises memory access lines that are used to set the contents of a memory device, such as the memory element 72. The information provided to the setter 68 permits the setter to set device direction policy that is stored at the memory element 72. The device direction policy is represented by the block 84. The policy stored at the memory is provided to the message generator 74 that generates a message, e.g., a SIP Publish message, a SIP Message message, XCAP/HTTP request message, or USSD message, that is provided to the transmit part of the transceiver circuitry 76 and is sent, here by way of a radio air interface 88, to the radio access network and forwarded to the application server 28. The information contained in the message is provided, represented by the line 54, to the setter 42 of the application server. When the device direction policy, stored and maintained at the application server or other network entity, such as a user preference profile server on XDMS, is user-input, the apparatus 66 maintained at the device 24 is utilized and operated in the manner just-described. Operation of an embodiment of the present disclosure, including the embodiment shown in FIG. 1, provides a manner by which to cause an invitation to a session to be directed to the preferred device of a user based upon the media type or types offered in the Invitation. Also, in an ongoing session that uses one or more media types, if a re-invitation containing an offer is received for the same session that adds or modifies one or more media types, the new media type is able to be routed to a different device from the one currently in the session. For example, if a user is receiving an audio session on a mobile phone and the user wishes to accept an added video streaming media on another device, such as a laptop computer of the user, the additional media is routed thereto. Also, in ongoing sessions that use more than one media types, a user may request to redirect one of communication sessions based on media type to another device. The application server terminates the previously ongoing one of sessions which will be routed to a new device, establishes a new session to the new device and redirects the messages based on the media type to the new device. For example, if a user is receiving an audio session and a video session on a mobile phone and the user wishes to redirect the video session to another device, the ongoing video session is terminated on the original device. And then the new video session is established to a new device and additional video media is routed to the new device. Operation of an embodiment of the present disclosure therefore satisfies various requirements of the OMA-RD_COM-V1_0-20070927_D specification, specifically CPM-MLD-002, CPM-MLD-006, and CPM-MLD-012. CPM-MLD-002 states that the CPM enabler shall be able to deliver continuous media to all or a subset of the devices with which the CPM user is registered based on media characteristics, communication capabilities, user preferences, and/or service provider's policy. CPM-MLD-006 states that the CPM enabler shall be able to deliver a CPM session invitation to all or a subset of the devices of the CPM user dependent upon the user's preferences, device capabilities, and/or service provider's policy. CPM-MLD-012 states that the CPM enabler shall allow a CPM user to choose which of his/her devices shall be used for the added/modified continuous media within the current CPM session.

The simplest basic SIP session case is between the devices, here the devices 22 and 24, of two users with only SIP proxies that do not perform application level functions. Using the basic SIP session case without any intermediate application level function, and without operation of an embodiment of the present disclosure, any redirection of sessions or communication messages to provide a solution to this problem would require that the inviting user's device support the functionality to redirect sessions and/or communication messages to individual devices of the invited user and support redirection of one of the media types of a session to another device of the invited user. There would likely be charging implications on the inviting user if multiple separate SIP dialogs are established between the inviting user's terminal and the separate devices of the invited user as each dialog would likely be billed as a separate session, particularly if the inviting user is using an expensive bandwidth connection like those in mobile networks.

An embodiment of the present disclosure permits the invited user to redirect the session or certain media types of the session and/or communication messages, and the service provider of the invited user or receiving user provides the application level server 28 and apparatus 36. The solutions for redirection of the session or certain media types of the session and/or communication messages are based upon the use of the application level server 28 that includes, and acts as a back-to-back (B2BUA), and hence is able to terminate the SIP dialog and redirect sessions and/or communication messages to the appropriate device or devices 24 of the invited user.

The user has, e.g., terminals 24 that support Globally Routable User Agent URIs (GRUUs), as per draft-ietf-sip-gruu, which allow the user to register all of the user's devices 24 with a single identity (URI) but address them individually using the GRUU that uniquely identifies the device. Alternatively the user has, e.g., terminals that use separate URIs or telephone numbers but the user also registers all these devices with a single URI that can be used to address the user.

When the user receives an invitation to a session, the session is directed to the preferred device 24 of the user based upon the media type or types offered in the Invitation. When the User receives an incoming communication message, the communication message is directed to the preferred device 24 of the user based upon the media type or types indicated in the communication message. The server 28 supports the ability for the user to set user preferences, e.g., expressed as XML documents derived from the IETF's Common-Policy and its extensions, and/or the service provider to set policy in order to configure which device or devices 24 of the user are invited to the session based on the media characteristics of the session, and shall here be given the name Media tokens. The Media tokens include, e.g.: media characteristics, Service Communication ID. With the Media token, the user is also able to communicate a Public User Identity, whereby the Public user ID includes, e.g.: GRUUs, SIP URIs or SIPS URI or Telephone Numbers (TEL URI) or other URI or an instance ID e.g. MAC address, IMEI, PIN, ESN etc. the Communication Capabilities of the devices. The IETF's common-policy and its extensions in OMA PAG and ETIS TISPAN WG3 and XCAP, per RFC 4825, or some other mechanism, such as a web based interface or the SIP Publish mechanism, RFC 3903, is used to transfer the user preferences that configure which device or devices 24 are invited. The user preference is, e.g., stored in an XDMS or some other database that stores User Preferences. Other methods such as USSD or SMS are alternately used to set user preferences.

A user preference is expressed, e.g., by XML documents derived from the IETF's Common-Policy xml Schema and its extensions. The common-policy framework describes conditions, actions and transformations. Conditions allow the application server 28 to filter SIP requests. If conditions evaluate to true, associated optional transformations and/or actions are executed. Actions and transformations are application-specific. An example action comprises a 'split-off' of some media from a re-invite, i.e., transform the re-invite, and to originate a second invite to another UE with the split-off media, i.e. action. Alternatively, the TISPAN WG3's sim-servs.xsd document is used as a framework to specify management of the service.

The service is configured with an ordered set of rules. The XML schema (e.g. DTD, XML Schema, or other XML schema) reuses the rule syntax as specified by the common policy draft (see, e.g., RFC 4745). In one implementation, the rules take the following form:

```
<?xml version="1.0" encoding="UTF-8"?>
<cp:ruleset xmlns="urn:ietf:params:xml:ns:common-policy">
    <cp:rule id="rule66">
        <cp:conditions>
            condition1
            condition2
        </cp:conditions>
        <cp:actions>
            <split-media m="<some media>">
                <target>
                    targetAddress1
                </target>
            </split-media>
        </cp:actions>
        <cp:transform>
```

```
            <split-media m="<some media>"/>
        </cp:transform>
    </cp:rule>
</cp:ruleset>
```

The above service is performable at any time or is performed automatically, e.g., if the user reconfigures user's device where the ruleset//rule//action//split-media element (if present) initiates a session towards targetAddress1 comprising certain media and the ruleset//rule//transformation//split-media element (if present) initiates a session towards the original targetaddress comprising other or remaining media.

The service is configured with an ordered set of rules. The XML schema reuses the rule syntax as specified by the common policy draft (see, e.g., RFC 4745). In one implementation, the rules take the following form:

```
<?xml version="1.0" encoding="UTF-8"?>
<cp:ruleset xmlns="urn:ietf:params:xml:ns:common-policy">
    <cp:rule id="rule66">
        <cp:conditions>
            condition1
            condition2
        </cp:conditions>
        <cp:actions>
            <split-media csi="icsi1,icsi2">
                <target>
                    targetAddress1
                </target>
            </split-media>
        </cp:actions>
        <cp:transform>
            <split-media csi=" icsi3,icsi4"/>
        </cp:transform>
    </cp:rule>
</cp:ruleset>
```

The above service is performable at any time or is performed automatically, e.g., if the user reconfigures user's device where the ruleset//rule//action//split-media element (if present) initiates a session towards targetAddress1 comprising certain Communication Service IDs (e.g. icsi) and the ruleset//rule//transformation//split-media element (if present) initiates a session towards the original targetaddress comprising other or remaining Communication Service IDs (e.g., icsi).

In the particular case of ICSI used to indicate the IMS communication service, the values indicated in the XML extension element to IETF common-Policy (e.g., in //split-media element's csi parameter in the example) can be matched against the ICSI as represented in the IMS SIP method (e.g., P-Asserted-service value or Accept-Contact or other header field).

In the particular case of ICSI used to indicate the IMS communication service, the values indicated in the XML extension element to IETF common-Policy (e.g., in . . . //split-media element's csi parameter in the example) can be matched against the value within quotes of the g.ims.app_ref media feature tag as defined in subclause 7.9.2 of 24.229 and RFC 3840.

Figure 2:
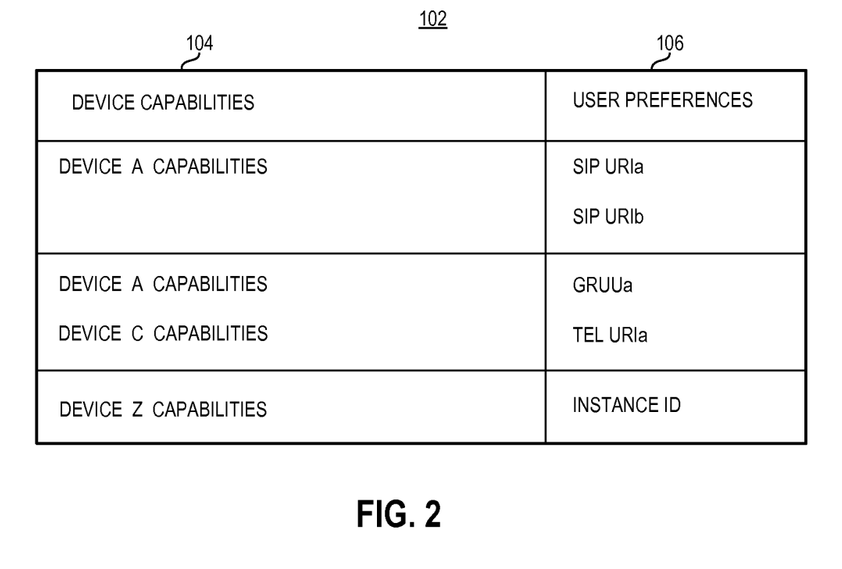
FIG. 2 illustrates a representation of exemplary information forming a device direction policy of an embodiment of the present disclosure.

When a Communication Service ID (e.g., IMS Communication Server Identifier (ICSI)) is sent from the UE to the network, the Communication Service ID shall implicitly define a set of media characteristics. FIG. 2 illustrates exemplary information forming a listing 102 that is stored at the application server. The column 104 lists communication service identifications (IDs), and the column 106 identifies user preferences.

Figure 3:
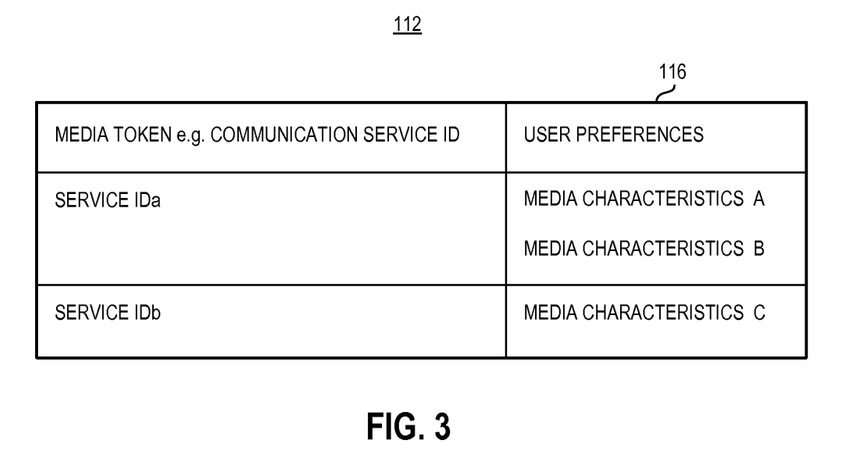
FIG. 3 illustrates a representation illustrating exemplary mapping of a media type to user-preferred devices.
Figure 4:
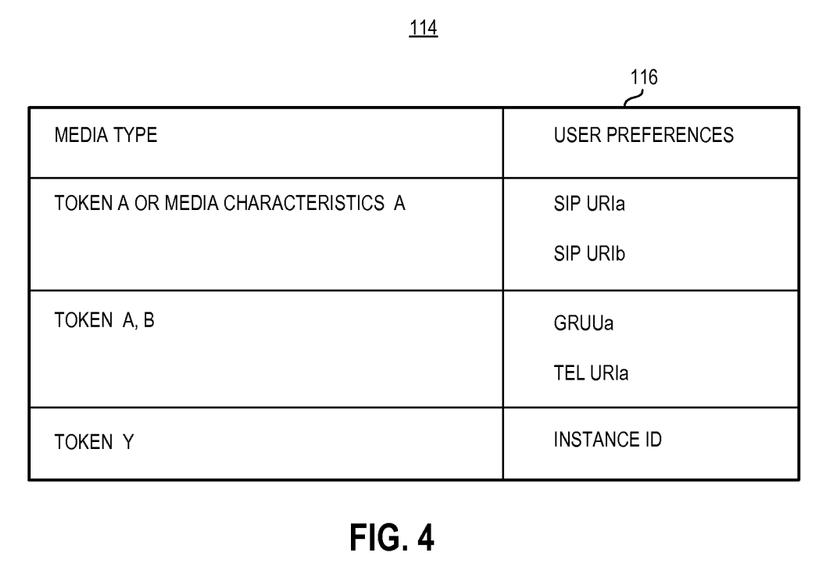
FIG. 4 illustrates a representation, similar to that shown in FIG. 3, but of other exemplary information forming a device direction policy.

The user preference information, in an exemplary implementation, has a mapping of media types offered in the incoming session or communication message to a selected device or devices 24. The device identifiers comprise, e.g., GRUUs, SIP URIs or SIPS URI or Telephone Numbers (TEL URI) or other URI. When an incoming Invitation or communication message arrives at the application server 28, the server compares the media types identified in the invitation or communication message and routes the Invitation communication message to the addresses, e.g., the GRUU, SIP URIs, SIPS URI or Telephone Numbers (TEL URIs) that correspond to the media type or types listed in a User Preference mapping. FIGS. 3 and 4 illustrate exemplary listings 112 and 114 that identify exemplary user preferences, shown in the columns 116 of the listings 112 and 114. The user preferences are indexed together with media types in the listing 112, and the user preferences are indexed together with device capabilities in the listing 114.

In an alternate implementation, the user preference information contains a mapping between media types and media feature tags (as per, e.g., RFC 3840), and the user's device 24 registers media feature tags for those media capabilities that the device supports. In this case when the incoming Invitation or communication message arrives at the server 28, the server compares the media types in the invitation and adds an Accept-Contact header (see, e.g., RFC 3841) to the invitation or communication message containing the media feature tags that correspond to the media type listed in a user preference mapping before forwarding the invitation, or multiple invitations communication messages. The Accept-Contact header causes the SIP network to route the invitation or communication message to those devices that have explicitly registered those media feature tags (as per, e.g., RFC 3840 and RFC 3841). This implementation differs from procedures conventionally provided pursuant to RFC 3840 and RFC 3841 as the conventional procedures only provide for the inviting user's device 22 indicating caller preferences in an Accept-Contact header. However, in many cases, the inviting user's device does not support RFC 3841. Also, RFC 3841 teaches only a manner for an inviting user to request to reach a device with certain capabilities based on the inviting user's preferences. Here, in contrast, it is the invited user that sets the preferences and the RFC 3841 and RFC 3840 mechanisms are used to route the session to the devices that support certain capabilities.

The accept-contact header information is, e.g., mapped to common-policy documents set forth above. This would be an internal representation allowing a user or administrator to modify the representation using various mechanisms. Concurrent access to the same rules needs to be guarded in order to prevent user experiences inconsistent with the user's expectation. For example, using Accept-Contact mapping, a set of rules with unique rule-ids and priority are created that do not interfere with rules created using other mechanisms. An alternative would be to allow Accept-Contact resulting rules, i.e., rules active for the period of the registration or rules active until the next modification, to override rules provisioned using other mechanisms. Some rules apply to all UEs registered with a particular range of public user identifiers and some rules, e.g. those resulting from mapping accept-contact information to common-policy or another representation, apply only to a particular UE.

The setting of the preferences is, in one implementation, is automatic and is performed by the device. E.g., when comprised, of a UE, the setting is performed at the time of registration, whereby the tokens communicated in the SIP REGISTRATION message are passed to the application server 28 via a third party registration and subscription to a Reg Event package. In this variation on the above techniques, the server subscribes to the registration event package using the mechanisms specified in RFC 3680 and draft-ietf-sipping-gruu-reg-events in order to determine the capabilities of the devices and their corresponding addresses, e.g., GRUUs, SIP URIs, SIPS URI or Telephone Numbers (TEL URIs). The server is then able to route the invitation or communication message based upon the media types in the invitation to the devices that indicated support for those media types/capabilities in the registration event package. The user may enable this selective routing based on the User Preferences.

A device comprising a UE can change its characters by moving from one Radio Access Type (RAT) to another, in that a UE that was once capable of supporting video over I-WLAN is now using GPRS over GERAN. As such, the application server 28 may well need to alter the settings based on where the UE is positioned.

Figure 5:
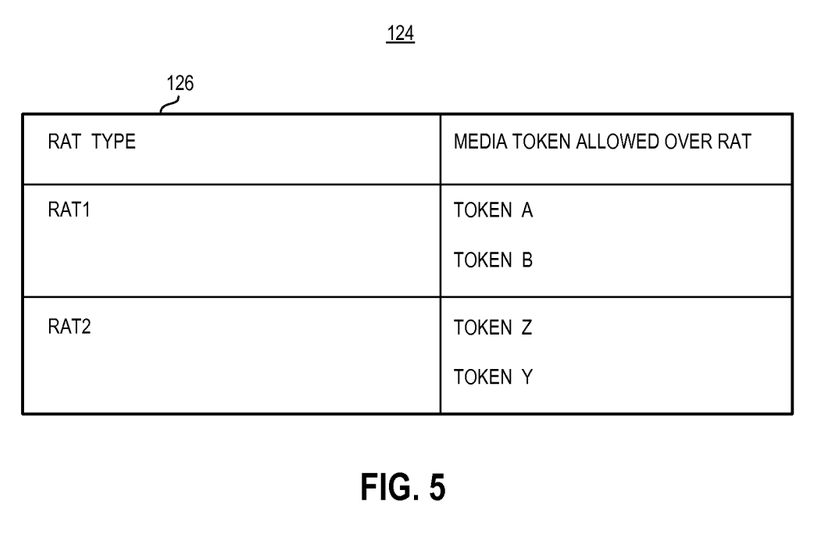
FIG. 5 illustrates another representation, here illustrating the device direction policy indexed together with radio access types of radio networks.

FIG. 5 illustrates another representative listing 124. Here, the listing stored with the application server indexes, together with the Media tokens, identification of a list of acceptable RAT types, shown in the column 126, that media can be delivered over. While, not shown, a listing analogous to the listing 124 instead identifies which media tokens are not allowed over a RAT.

Here, when the UE registers in the SIP REGISTER, a P-Network-Access-Info header is provided. This information is communicated to the application server 28 so that the application server can adapt its routing tables. Alternately, the application server subscribes to a presence function or a domain selection function to determine the RAT in which the UE is registered.

In one implementation, a UAprof is used to communicate the device capability information to the application server. Thus, after the UE registers with the network, the UE communicates its capabilities via the UAprof or some other mechanism.

And, in one embodiment, the user is able to interrogate, activate and deactivate the settings in the network. Furthermore, given that a user may have many Public User IDs, one of the User IDs may be in use by another person, e.g., a family member. Thus, the application server 28 only divulges the settings for a Public User ID to the person who created that setting or a person that is using that public user ID. Thus, when the application server receives a request to interrogate the user preferences in the network, the server performs:

Public User received=one stored
Yes show configuration information for that public user ID
Private User ID received=one stored
Yes show all configuration information provided by that Private user ID The user is also be able to set a master Private User ID that, by default, states who can change settings for all public users' IDs whereby other public users' IDs can only change their settings.

Figure 6:
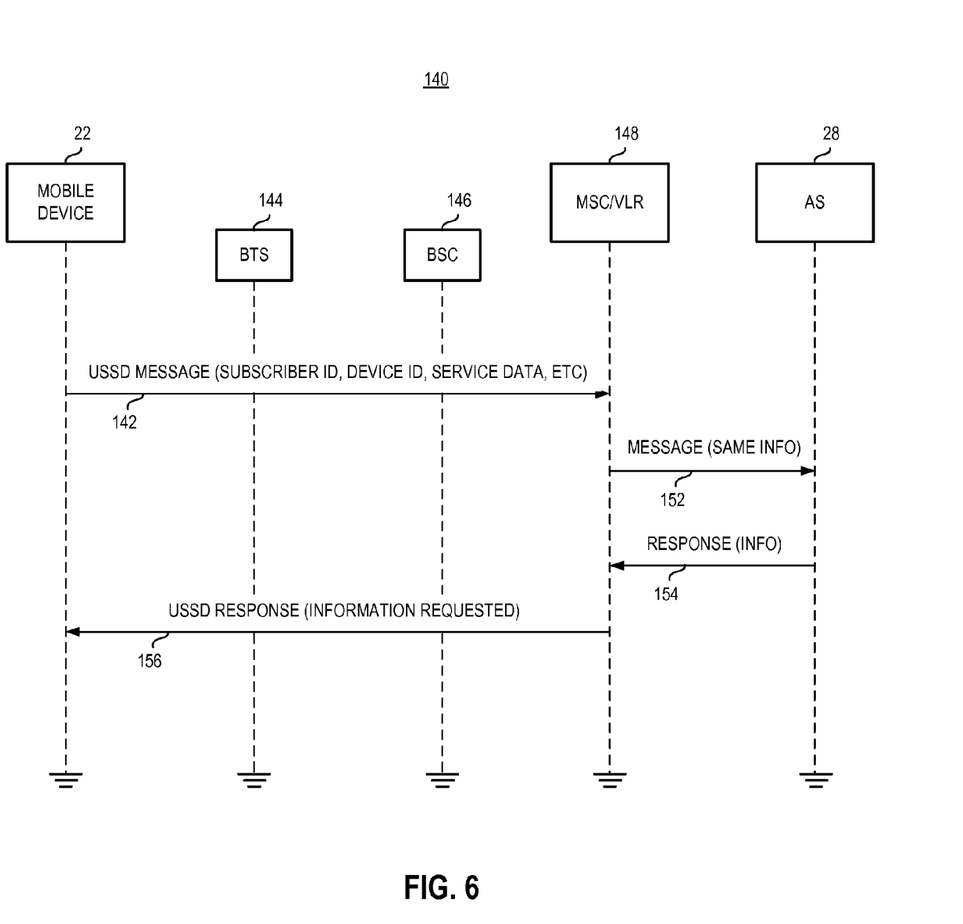
FIG. 6 illustrates exemplary signaling generated pursuant to operation of an embodiment of the present disclosure.

In an exemplary GSM-based, or other, implementation, USSD is used in the CS (circuit-switched) domain to activate, interrogate, deactivate, modify the user policy. XCAP or SIP PUBLISH, MESSAGE can be used in the IMS domain. The USSD or SIP message contains, e.g., the following information elements: a subscriber ID, e.g., IMSI; a terminal ID, e.g., an IMEI; a combination of the above, e.g., a GRUU; an action being taken, such as activate, deactivate, modify, or interrogate, and a policy information (Public User ID, Media Token). FIG. 6 illustrates a signaling diagram, shown generally at 140, representative of exemplary signaling using USSD-formatted messaging. A communication device 22, here a mobile device, generates and sends a USSD message 142 that includes a subscriber ID, a device ID, service data, and other information. The message is routed through radio access network elements, here including a base transceiver station (BTS) 144 and a base station controller (BSC) 146 for delivery to an MSC/VLR (Mobile Switching Center/Visited Location Register) 148. The MSC/VLR forwards on the message information as the message 152 for delivery to the access server 28. A response message 154 is returned to by the access server 28 to the MSC/VLR 148. And, the MSC/VLR forms a USSD-formatted message 156 that includes the response information to the device 22.

Analogously, the user is also able to deactivate policies. The user is able to set, e.g., the following preferences: policies for all registered Public User IDs; and policies for public user IDs listed.

The user is also able to deactivate policies. When the user deactivates policies, the user is able to set the following preferences: policies for all registered Public User IDs; and policies for public user IDs listed.

The user is also able to register settings in the network in the exemplary embodiment. the following are returned and displayed:

Public User ID A
Media Token A
Public User ID B
Media Token A
Media Token B
Instance ID
Device Capabilities The user, in the exemplary implementation, is further able to modify policy settings.

The examples are in eight-bit binary. Alternately, four-bit binary, or another scheme, is instead used. Also, in one implementation, the information is coded in XML. An exemplary, general syntax is:

```
Operation to perform
    ETag, rule ID
Length
    Length
        Choice (Public User ID|Instance ID)
        Number of Media Tokens
            Length Media Token A
                Media Token A
            Length media token N
                Media Token N
    Private User ID:
        Public User ID Token1
            Media Token A
            Media Token B
            Etag
        Public User ID Token2
            Media Token C
            Media Token D
            Etag
```

In one implementation, XCAP is used to manage media forwarding policies stored on servers or stored behind aggregation servers, such as, e.g., in an XDM architecture, in which policies are actually stored on UEs rather than servers, or a combination thereof. XCAP is mappable to USSD.

The user/operator preferences, as described above, are stored in a device 24. When the device comprises a UE, information is stored in the memory of a fixed memory element of the UE, or the information is stored on a removable memory module such as but not limited to: (U)SIM, Compact Flash, Memory Stick, MicroSD, R-UIM, UICC etc.

In one implementation, when the information is provisioned in the network, the network sends a configuration message to all the devices 24 where one of the Public User IDs is registered. This configuration message is constructed, e.g., using proprietary encoding, e.g., OTA over SMS or USSD etc or using OMA DM. A UE is further configured, e.g., to have a local copy of the latest received/modified rules as stored in the network in Common-Policy XML format or another representation. XCAP uses the Etag mechanism to indicate that rules as known to the UE have changed. A mapping of Etag to other transports mentioned above ensures that the UE is not changing 'yesterday's' rules. In short, for example, the UE will attempt to change a rule identified by its id. and add the Etag as stored on the UE to the request. If the Etag is not the same as the one stored on the server, the server informs the UE and possibly presents the rule as stored on the server. If the Etag is the same, the request of the UE succeeds and a new Etag is generated and returned to the UE, for storage on the UE.

Alternatively, modified rules are pushed to all devices known to have local representation of the identified rules, upon change.

With respect to a modification of an ongoing session, once a user has accepted a session on one or more of the devices 24, the decision made as to where to route additional media types or modified media types is influenced by the fact that the user has already accepted the session on one device 24 and based of the nature of the session the user may choose, on a per session basis, to decide whether to accept the session on the same device or redirect the session to another device.

Figure 7:
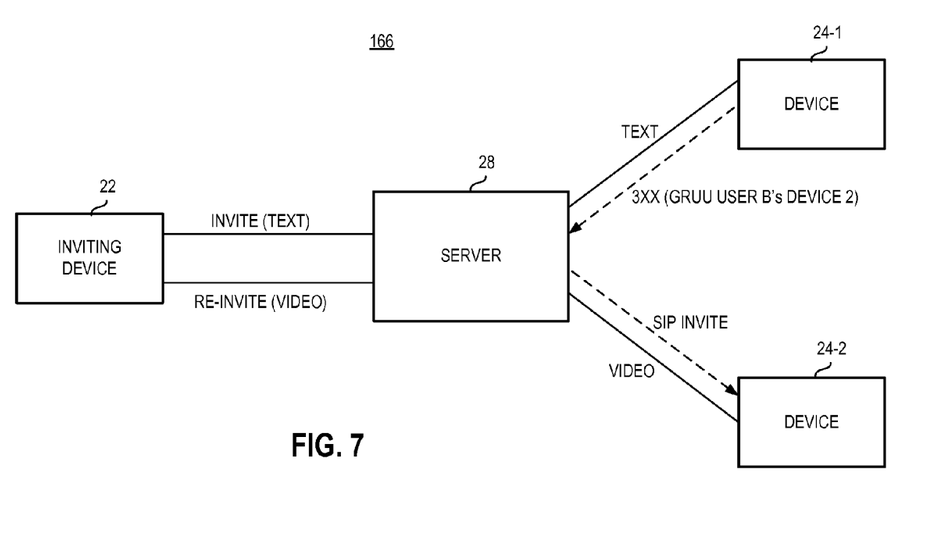
FIG. 7 illustrates a functional block diagram representative of signaling generated during another embodiment of the present disclosure.

An embodiment of the present disclosure further provides a mechanism that enables on a per session basis, a user to redirect the addition or modification of a new media type for that session to another device of the user. FIG. 7, for instance, illustrates a scenario in which the inviting device 22 sends an Invite (Invite(Text)) that is provided to the server 28 and then text information (TEXT) is forwarded on to a selected device 24-1 with which a text-based communication session commences. Subsequently, a Re-Invite (Re-Invite(Video)) is sent for an additional media type, here to modify the session to include video. The additional media service session is carried out with the device 24-2. A SIP Invite (SIP INVITE) is sent to the selected device 24-2 and video (VIDEO) is then provided to the device 24-2.

For the case when the user receives an invitation, a communication message, or a re-invitation, e.g., a SIP INVITE request that creates a new SIP dialog or that is received on the existing SIP Dialog of the existing SIP session, offering to establish a new Communication Session or add a new media type or modify an existing media type, the user's device sends a SIP 3xx, e.g., a SIP 300 (Multiple Choices) response or SIP 302 (Moved Temporarily response) or other SIP 3xx response. The SIP 3xx response includes one or more contact headers containing the GRUU, SIP URI, SIPS URI or Telephone Number (TEL URI) or other URI of the device or devices the user wishes the communication server to redirect the re-invitation to. Upon receiving the 3xx response the communication Server invites the device or devices specified in the Contact(s) in the 3xx response. In addition the contact header(s) may contain one or more media tokens that indicate the media types that indicate the media types that are to be redirected to the associated contact. When the additional device accepts the session with a 200 OK response, the Communication Server sends a 200 OK response back on the SIP dialog with the inviting user.

One embodiment includes such a directive as part of the SIP 3xx body as noted below.

```
<?xml version="1.0" encoding="UTF-8"?>
<cp:ruleset xmlns="urn:ietf:params:xml:ns:common-policy">
    <cp:rule id="f3g44r3">
        <cp:actions>
            <split-media m="<some media>">
                <target>
                    targetAddress1
                </target>
            </split-media>
        </cp:actions>
        <cp:transform>
            <split-media m="<some media>"/>
        </cp:transform>
    </cp:rule>
</cp:ruleset>
```

Another embodiment indicates the media lines that are to be sent to another UE in the SDP. Multiple SDP bodies (i.e. requiring m-part support) can be included each indicating also the 'target; address' as noted below.

```
SIP3xx method
[..]
SIP body start
    SIP m-part body 1 start
        <SDP body A>
    SIP m-part body 1 end
    SIP m-part body 2 start
        <target address 1>
    SIP m-part body 2 end
    SIP m-part body 3 start
        <SDP body B>
    SIP m-part body 3 end
    SIP m-part body 4 start
        <target address 2>
    SIP m-part body 4 end
SIP body end
```

Or with recursive multipart bodies:

```
SIP3xx method
[..]
SIP body start
    SIP m-part body 1 start
        SIP m-part body 1a start
            <SDP body A>
        SIP m-part body 1a end
        SIP m-part body 1b start
            <target address 1>
        SIP m-part body 1b end
    SIP m-part body 1 end
    SIP m-part body 2 start
        SIP m-part body 2a start
            <SDP body A>
        SIP m-part body 2a end
        SIP m-part body 2b start
            <target address 1>
        SIP m-part body 2b end
    SIP m-part body 2 end
SIP body end
```

In an alternative implementation the Re-INVITE is not sent to the user. Rather, the application server 28 already has knowledge as to how to handle the new or modified media. In this situation, the communication server shall send SIP INVITE to the appropriate devices (per configuration information).

Thus the inviting user that requested the addition of a new media type to the session is informed that the invited user has accepted the session but is unaware that the session is now connected to multiple devices of the invited user. When the communication server 28 receives the different media types for the session, the server filters each media type from messages, forwarding different media to the different devices of the user. E.g., text media type messages are forwarded to the device 24-1, and video media type messages are forwarded to the device 24-2.

A variation on this scenario comprises a communication message, an invitation, or a re-invitation that contains an offer to add or modify more than one media type. In this case the user is able to choose to redirect one media type, e.g., audio, to one device, such as the device 24-2, and the other media type, e.g., video, to another device, such as the device 24-N. The SIP 300 (Multiple Choices) response can contain a body. This body contains a list of contacts and corresponding media types, e.g., using media feature tags. The media types in the body identify the contact or contacts that the user wishes the communication server 28 to send an Invite to or the communication message to for that Media Type or types. The contacts comprise, e.g., the GRUU, SIP URI, SIPS URI or Telephone Number (TEL URI) or other URI of the device. Using the SIP 300 response with this message body, the user is able to specify that one Invitation or communication message with one media type is sent to one device and another Invitation or communication message containing another media type is sent to another device. When the communication server receives the SIP 300 (Multiple Choices) response, the server uses the body to determine which contact or contacts to send Invites or communication messages containing specific media types. For a situation in which the re-invitation contains an offer to add more than one media type and the user chooses to accept one media type, e.g., audio) on the current device, such as the device 24-1 and the other media type, e.g., video, on another device, such as the device 24-2, the SIP 300 (Multiple Choices) response body contains the contact of the current device along with the contact of the other device with the media type to be routed to each device associated with that contact. The communication server then re-invites the current device with an offer containing just those media types associated with the contact of the current device in the SIP 300 (Multiple Choices) response body and sends an invitation to the other device containing the media types associated with the contact of the this device in the SIP 300 other (Multiple Choices) response body. Note that in the case the session is already associated with the additional device, then the communication server 28 would re-invite that device using the existing dialog.

In the case in which the media type is modified for a communication session and redirected to another device resulting in no active session on the current device, the current device sends a SIP BYE to the communication server. Or, the communication server sends a SIP BYE to the current device after the session has been transferred to the new device. The body in the SIP 300 Response is, e.g., in XML format or some other encoding.

In an alternate implementation, the SIP REFER method (as per, e.g., RFC 3515) is used to by the invited user's device to request the communication server to send invitations with offers of different Media Types or communication messages to different devices of the user. The SIP REFER request contains, e.g., a recipient-list body (per draft-ietf-sip-multiple-refer). This body contains a list of URIs which can be GRUUs, SIP URIs, SIPS URI or Telephone Numbers (TEL URI) or other URIs and these URIs can contain a Method parameter that contains the SIP method for the Communication Server to send to that URI entry in the list. The URI can also contain a header parameter that can contain the headers of the SIP request including the session description in a header parameter known as "body", and, thus, the invited device or receiving device can include the media type in the header parameter, e.g., within the session description of the SIP INVITE or the Content-Type of the SIP MESSAGE. This is based upon RFC 3261 text as follows:

Headers: Header fields to be included in a request constructed from the URI.

Headers fields in the SIP request can be specified with the "?" mechanism within a URI. The header names and values are encoded in ampersand separated hname=hvalue pairs. The special hname "body" indicates that the associated hvalue is the message-body of the SIP request.

The SIP REFER request is sent within the same dialog as the invitation, or re-invitation, or the request is sent outside of any dialog and for the case of a communication session the Target-Dialog header (as per, e.g., RFC 4538) can be used to associate the SIP REFER request with the original dialog on which the invitation or re-invitation was received. The use of the Target-Dialog header allows the communication server to authorize the SIP REFER request and associate the invitations sent as a result of it to the session originally established. If needed, as above, the original device sends an Invitation back to itself in order to modify the media type of the existing session by including it own URI (GRUU, SIP URI, SIPS URI or Telephone Number (TEL URI) or other URI in the entry in the recipient list and including the Replaces header (as per, e.g., RFC 3891) in order to indicate that the new dialog initiated as a result of the REFER should replace the existing dialog and existing session. In this case as well as the case that the Media Type is modified and redirected to another device resulting in no active session on the current device, the current device sends a SIP BYE to the Communication Server or the Communication Server sends a SIP BYE to the current device after the session has been transferred to the new device. Note when the added media type or types is only redirected to one other device, the SIP REFER request does not need to include a body containing a recipient list as the URI of the device that the new media type is redirected to can be include in the Refer-To header in the SIP REFER request. The URI in the Refer-To header also contains, e.g., the method parameter including the INVITE and the header parameter "body" including the session description as described previously.

As in the previous-described scenario, when the additional device accepts the session with a 200 OK response, the communication server sends a 200 OK response back on the SIP dialog with the inviting user. Thus the inviting user that requested the addition of a new media type to the session is informed that the invited user has accepted the session but is unaware that the session is now connected to multiple devices of the invited user. When the communication Server receives the different media types for the session or communication messages it filters each media type from messages, forwarding different media to the different devices of the user, e.g., text media type messages are forwarded to the communication device 24-1 and video media type messages are forwarded to the communication device 24-2.

Analogous techniques are also applicable to SIP MESSAGE method with SIP INVITE method replaced by SIP MESSAGE method. Further, in other implementation, other SIP METHODS such as SIP MESSAGE or SIP PUBLISH are substituted for REFER in the description given hereinabove.

In the above scenario, it is also possible that, when the application server detects a change of RAT via session continuity, the application server performs the above operations on behalf of the user. In that the server sends a Re-INVITE to the party that is not moving RATs.

The server can further be configured such that, when the server detects a session continuity with specific parameters, the server redirects some or all of the media types to different devices. Take for example an example in which a user is outside in a video call and then moves into a house. The UE then performs a session continuity onto the WLAN in the house. The UE will perform a SIP REGISTRATION and this will cause the server to be updated with the UE's access technology. The server may release that the UE is at home and then could either prompt the user if they want to transfer the video to the TV and, if so, request transfer the video per solutions described above; or automatically transfer the video to the TV per solutions described above.

Figure 8:
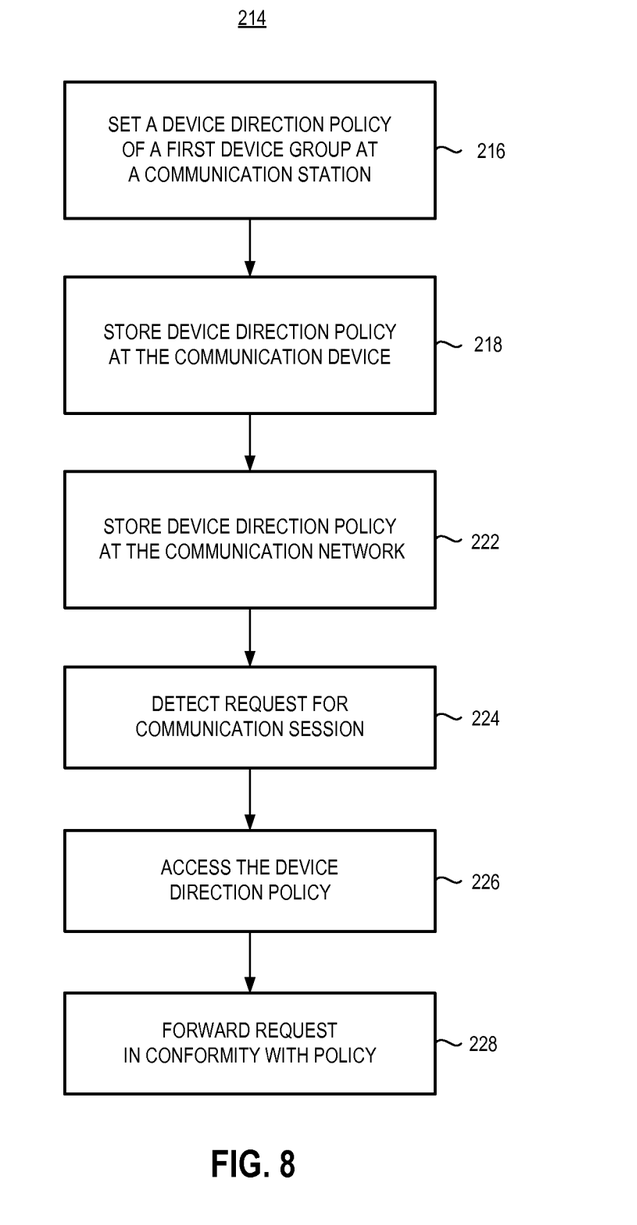
FIG. 8 illustrates a method flow diagram representative of the method of operation of an embodiment of the present disclosure.

FIG. 8 illustrates a method flow diagram, shown generally at 214, representative of the method of operation of an embodiment of the present disclosure. The method facilitates communication of a communication device of a first device group comprised of at least one communication device.

First, and as indicated by the block 216, a device direction policy associated with the first device group is set at the communication device. The device direction policy identifies device direction handling of communication sessions or communication messages of selected media types. Then, and as indicated by the block 218, the device direction policy is stored at the communication device.

The device direction policy is stored, indicated by the block 222, at a communication network. The device direction policy stored at the network, e.g., is provided thereto by the communication device. Then, and as indicated by the block 224, a request for initiation of a communication session or reception of a communication message is detected. The device direction policy is accessed, indicated by the block 226. And, as indicated by the block 228, the request for initiation is forwarded in conformity with the device direction policy.

Presently preferred embodiments of the disclosure and many of its improvements and advantages have been described with a degree of particularity. The description is of preferred examples of implementing the disclosure, and the description of preferred examples is not necessarily intended to limit the scope of the disclosure. The scope of the disclosure is defined by the following claims.

What is claimed is:

1. A method for setting up a communication session having more than one media type, the method comprising:
   receiving, by a first invited device from a network apparatus, a communication session invitation associated with establishing a multimedia communication session between an inviting device and the first invited device facilitated by the network apparatus, the communication session invitation containing an offer with a plurality of media types for the multimedia communication session, wherein the communication session invitation is a SIP INVITE or SIP Re-invite message; and
   in response to the communication session invitation, sending a response message by the first invited device to the network apparatus, wherein the response message is a SIP 300 (Multiple Choices) response message and includes a Contact header containing a plurality of device addresses, one of the plurality of device addresses being an address of the first invited device, and another of the device addresses being an address of a second invited device;
   indicating to the network apparatus in an XML body of the SIP 300 response, for each respective device address of said plurality of device addresses, at least one respective media type to be included in a respective SIP INVITE sent to the respective device address, wherein the XML body of the SIP 300 response includes at least an address for a second invited device and identifying at least one corresponding media type of the multimedia communication session to be established at the second invited device in addition to at least one media type to be established at the first invited device as part of the same multimedia communication session with the inviting device; and
   receiving, by the first invited device from the network apparatus, a second communication session invitation, the second communication session invitation being a SIP INVITE containing an offer with the at least one media type to be established at the first invited device as indicated in the XML body of the SIP 300 response.

2. The method of claim 1, wherein the first invited device and the second invited device are included in a group of devices associated with a common registration identity.

3. The method of claim 1, wherein the address for the second invited device includes a URI.

4. The method of claim 3, wherein the URI is one of a GRUU, individual telephone number, individual SIP URI, or SIPS URI.

5. The method of claim 1, wherein the at least one corresponding media type comprises one of an audio media type, a video media type, a text media type and a data media type.

6. A system for setting up a communication session having more than one media type, the system comprising:
   one or more processors executing instructions stored in memory, the one or more processors executing the instructions to perform the steps of:
      associated with a first invited device, processing a communication session invitation received from a network apparatus, the communication session invitation for establishing a multimedia communication session between an inviting device and the first invited device facilitated by the network apparatus, the communication session invitation containing an offer with a plurality of media types for the multimedia communication session, wherein the communication session invitation is a SIP INVITE or SIP Re-invite message; and
      in response to the communication session invitation, associated with the first invited device, sending a response message to the network apparatus, wherein the response message is a SIP 300 (Multiple Choices) response message and includes a Contact header containing a plurality of device addresses, one of the plurality of device addresses being an address of the first invited device, and another of the device addresses being an address of a second invited device
      indicating to the network apparatus in an XML body of the SIP 300 response, for each respective device address of said plurality of device addresses, at least one respective media type to be included in a respective SIP INVITE sent to the respective device address, wherein the XML body of the SIP 300 response includes at least an address for a second invited device and an identifier of at least one corresponding media type of the multimedia communication session to be established at the second invited device in addition to at least one media type to be established at the first invited device as part of the same multimedia communication session; and
      receiving, by the first invited device from the network apparatus, a second communication session invitation, the second communication session invitation being a SIP INVITE containing an offer with the at least one media type to be established at the first invited device as indicated in the XML body of the SIP 300 response.

7. The system of claim 6, wherein the first invited device and the second invited device are included in a group of devices associated with a common registration identity.

8. The system of claim 6, wherein the address for the second invited device includes a URI.

9. The system of claim 8, wherein the URI is one of a GRUU, individual telephone number, individual SIP URI, or SIPS URI.

10. The system of claim 6, wherein the at least one corresponding media type comprises one of an audio media type, a video media type, a text media type and a data media type.

11. A first invited device, comprising:
one or more processors executing instructions stored in memory, the one or more processors executing the instructions to configure:
a receiver to receive, from a network apparatus, a communication session invitation associated with establishing a multimedia communication session between an inviting device and the first invited device facilitated by the network apparatus, the communication session invitation containing an offer with a plurality of media types for the multimedia communication session, wherein the communication session invitation is a SIP INVITE or SIP Re-invite message;
a transmitter, in response to the communication session invitation, sending a response message to the network apparatus, wherein the response message is a SIP 300 (Multiple Choices) response message and includes a Contact header containing a plurality of device addresses, one of the plurality of device addresses being an address of the first invited device, and another of the device addresses being an address of a second invited device;
to indicate to the network apparatus in an XML body of the SIP 300 response, for each respective device address of said plurality of device addresses, at least one respective media type to be included in a respective SIP INVITE sent to the respective device address, wherein the XML body of the SIP 300 response includes at least an address for a second invited device and identifying at least one corresponding media type of the multimedia communication session to be established at the second invited device in addition to at least one media type to be established at the first invited device as part of the same multimedia communication session with the inviting device; and
the receiver to receive, from the network apparatus, a second communication session invitation, the second communication session invitation being a SIP INVITE containing an offer with the at least one media type to be established at the first invited device as indicated in the XML body of the SIP 300 response.

* * * * *